United States Patent [19]
Nyui

[11] Patent Number: 5,559,602
[45] Date of Patent: Sep. 24, 1996

[54] ROTATION MEASURING APPARATUS AND DISPLACEMENT MEASURING APPARATUS

[75] Inventor: Masaru Nyui, Tokyo, Japan

[73] Assignee: Canon Kabushiki Kaisha, Tokyo, Japan

[21] Appl. No.: 29,636

[22] Filed: Mar. 11, 1993

[30] Foreign Application Priority Data

Mar. 13, 1992 [JP] Japan .................. 4-089760

[51] Int. Cl.$^6$ .................. G01D 5/34; G01B 11/02
[52] U.S. Cl. .................. 356/374; 356/356; 250/231.16; 250/237 G
[58] Field of Search .................. 356/374, 373, 356/354, 356; 250/237 G, 231.16

[56] References Cited

U.S. PATENT DOCUMENTS

| | | | |
|---|---|---|---|
| 3,891,321 | 6/1975 | Hock | 250/237 G |
| 4,631,416 | 12/1986 | Trutna, Jr. | 250/237 G |
| 4,792,678 | 12/1988 | Spies | 356/374 |
| 5,249,032 | 9/1993 | Matsui et al. | 250/237 G |
| 5,260,568 | 11/1993 | Ieki | 250/237 G |
| 5,302,821 | 4/1994 | Igaki et al. | 250/237 G |
| 5,323,001 | 6/1994 | Igaki et al. | 250/237 G |
| 5,359,193 | 10/1994 | Nyui et al. | 250/237 G |
| 5,369,271 | 11/1994 | Nyui | 250/237 G |

FOREIGN PATENT DOCUMENTS

| | | |
|---|---|---|
| 10716 | 1/1986 | Japan . |
| 176914 | 7/1989 | Japan . |
| 197818 | 8/1991 | Japan . |

Primary Examiner—Robert P. Limanek
Assistant Examiner—David B. Hardy
Attorney, Agent, or Firm—Fitzpatrick, Cella, Harper & Scinto

[57] ABSTRACT

A rotation measuring apparatus has a grating disposed on a cylindrical surface along the circumferential direction thereof, an illuminating system for applying a light beam to a first location on the grating, light emerging from the first location by the application of the light beam from the illuminating system being incident on a second location on the grating, light beams for detection emerging in a plurality of directions from the second location on which the light is incident, a plurality of light receiving elements for detecting the light beams for detection, respectively, the relative rotation information of the grating and the light receiving elements being measured by the detection by the light receiving elements, and light intercepting means for preventing the light beam for detection which should enter at least one of the light receiving elements from entering a different light receiving element.

2 Claims, 13 Drawing Sheets

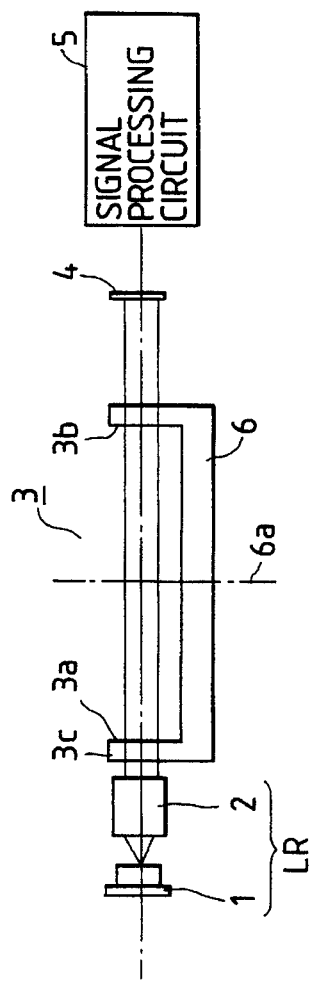
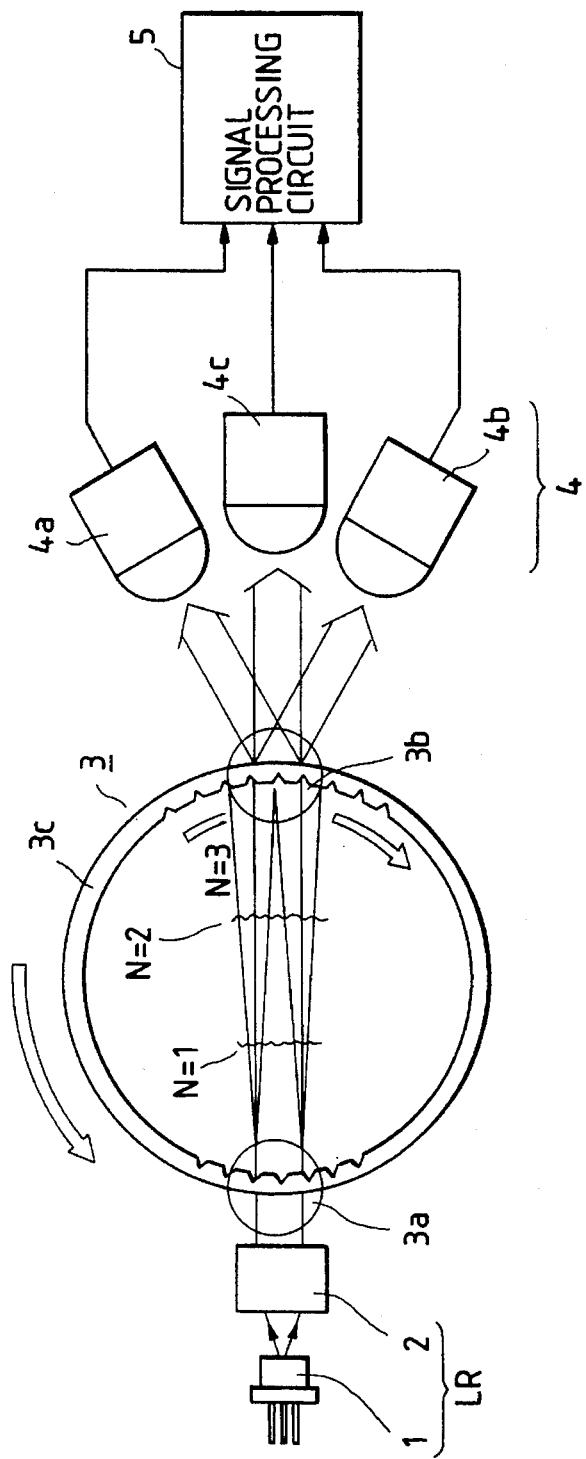

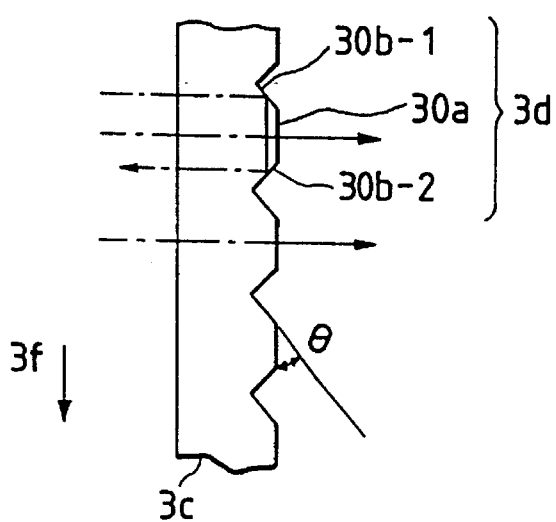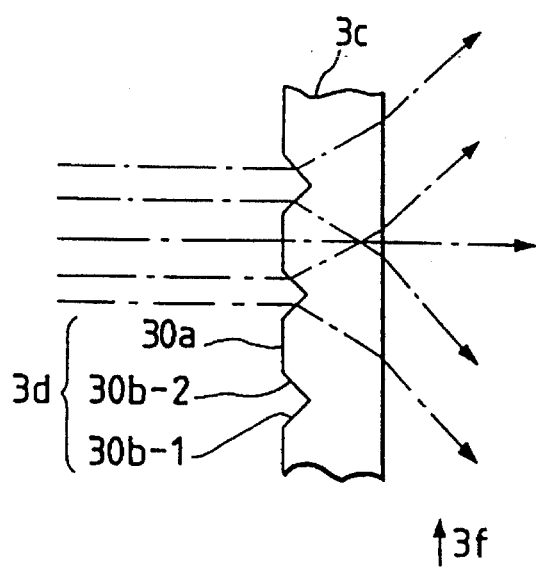
FIG. 5A
FIG. 5B PRIOR ART

+FIRST ORDER

ZERO ORDER

−FIRST ORDER

ZERO ORDER

+FIRST ORDER  −FIRST ORDER

+FIRST ORDER

ZERO ORDER

−FIRST ORDER $\lambda_0 / ((N+1/5)P^2)$
$\leq (\lambda_0 + \gamma \cdot \Delta t)/(N \cdot P^2)$
$-(\alpha - \beta)\Delta t/((1+\alpha \cdot \Delta t)(1+\beta \cdot \Delta t)f_0)$
$\leq \lambda_0 / ((N-1/5)P^2)$ $\lambda_0 / ((N+1/5)P^2)$
$\leq (\lambda_0 + \gamma \cdot \Delta t)/(N \cdot P^2)$
$-(\alpha - \beta)\Delta t/((1+\alpha \cdot \Delta t)(1+\beta \cdot \Delta t)f_0)$
$\leq \lambda_0 / ((N-1/5)P^2)$

1

ROTATION MEASURING APPARATUS AND DISPLACEMENT MEASURING APPARATUS

BACKGROUND OF THE INVENTION

1. Field of the Invention

This invention relates to a rotation measuring apparatus and a displacement measuring apparatus, and particularly can be well applied to a rotary encoder and an encoder in which a light beam is caused to enter a rotary member or a moving member having an optical scale comprising, for example, a plurality of uneven light-transmitting gratings periodically provided on the outer peripheral surface or the inner peripheral surface of a cylindrical body or on a flat surface, and the light beam passed through the optical scale is utilized to detect the rotation information or the movement information of the rotary member or the moving member.

2. Related Background Art

Photoelectric rotary encoders have heretofore been utilized as means for detecting the rotational speed or the amount of fluctuation of the rotational speed of computer instruments for the driving of floppy disc, business machines such as printers, NC machine tools or capsten motors for VTR or rotary mechanisms such as rotary drums.

As a technique utilized in such encoders, there is known so-called Talbot interference proposed in Japanese Laid-Open Patent Application No. 61-10716 and Japanese Laid-Open Patent Application No. 64-176914. FIGS. 1 and 2 of the accompanying drawings are schematic views of the essential portions of a rotary encoder utilizing this Talbot interference which is shown in Japanese Laid-Open Patent Application No. 3-197818, etc.

In these figures, the reference numeral 1 designates a semiconductor laser which emits a coherent light beam of a wavelength $\lambda$. The reference numeral 2 denotes a lens system for converting the divergent light beam from the semiconductor laser 1 into a convergent light beam. The semiconductor laser 1 and the lens system 2 together constitute light applying means LR. The reference numeral 3 designates an optical scale having an uneven light transmitting grating portion having a plurality of V-grooves periodically formed on the cylindrical inner peripheral surface thereof. The optical scale 3 is rotated in a direction indicated by arrow.

The optical scale 3 is formed of a light transmitting optical material. Three photodetectors 4a, 4b and 4c constituting light receiving means 4 are disposed in opposed relationship with the light applying means LR with the optical scale 3 interposed therebetween. The outputs of the photodetectors are connected to a signal processing circuit 5. The signal processing circuit 5 has a pulse counting circuit, a rotational direction discriminating circuit, a signal interpolation processing circuit, etc.

In the rotary encoder of FIGS. 1 and 2, the light beam from the light applying means LR is caused to enter an area of the optical scale 3, and the light beam light-modulated (diffracted) by the optical scale 3 is further caused to enter another area of the optical scale 3 to thereby light-modulate (deflect) the light beam. A plurality of (three) light beams having emerged from the optical scale 3 are received by the light receiving means 4, and the output signal from the light receiving means 4 is utilized to detect the rotation information of the optical scale 3.

SUMMARY OF THE INVENTION

It is a first object of the present invention to provide, in view of the above-described example of the prior art, a rotation measuring apparatus in which detection accuracy is improved in such a manner that light beams travelling toward light receiving means do not interfere with each other to reduce the S/N ratio of signal outputs.

It is a second object of the present invention to provide a displacement measuring apparatus as is represented by the above-described example of the prior art, but in which not only translational displacement and rotational displacement, but also various parameters are set appropriately, whereby displacement information such as highly accurate rotation information and movement information can be obtained.

Other objects of the present invention will become apparent from the following detailed description of the preferred embodiments of the invention.

BRIEF DESCRIPTION OF THE DRAWINGS

FIG. 1 is a cross-sectional view of the essential portions of a prior-art rotary encoder utilizing Talbot interference.

FIG. 2 is a plan view of the essential portions of FIG. 1.

FIGS. 5A and 5B are enlarged illustrations of a portion of FIG. 3

DETAILED DESCRIPTION OF THE PREFERRED EMBODIMENTS

In embodiments which will hereinafter be described, a light beam from light applying means is applied to a first scale of the optical scale of a rotary member provided with an optical scale comprising a grating of a predetermined period around a cylindrical member, the light beam light-modulated by the first scale is caused to enter a second scale of the optical scale, and the light beam light-modulated by the second scale is received by light receiving means having a plurality of light receiving elements, and in the optical path from the first scale to the light receiving means, provision is made of interrupting means for interrupting the entry of the unnecessary light of the light beam light-modulated by the second scale into each light receiving element when the rotation information of the rotary member is detected by the use of a signal from the light receiving means.

The embodiments are particularly characterized in that said interrupting means is comprised of a lens system having positive refractive power or a stop and that the grating of said optical scale is of an uneven shape having an inclined surface for light-modulating an incident light beam along the direction of rotation.

Figure 3:
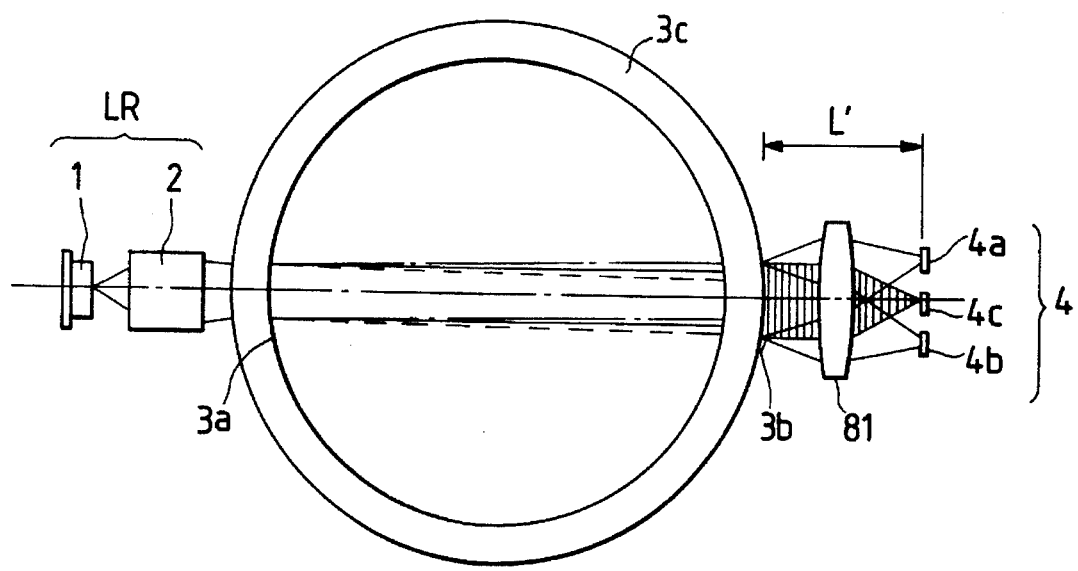
FIG. 3 is a cross-sectional view of the essential portions of Embodiment 1 of the present invention.
Figure 4:
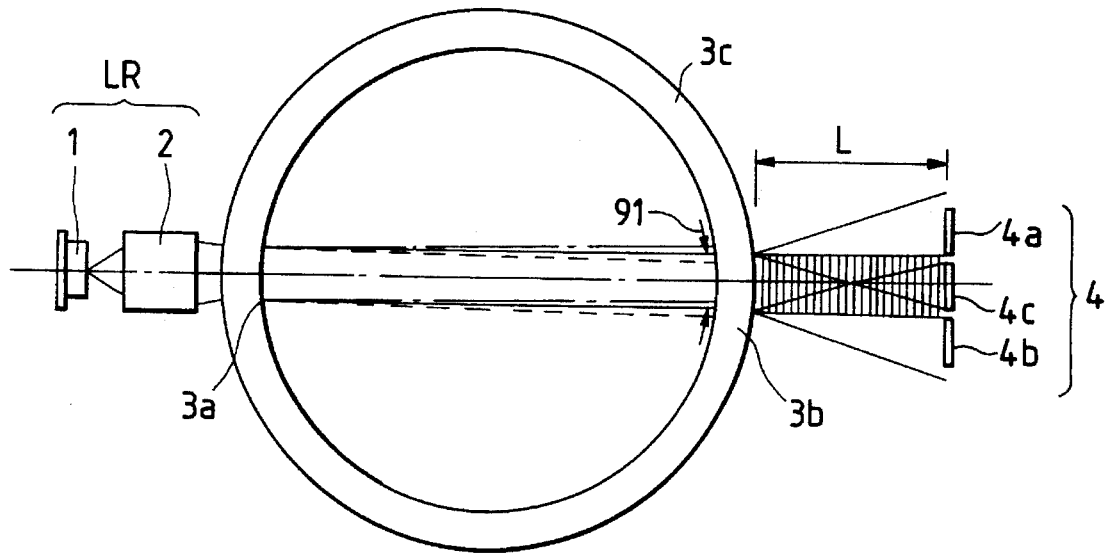
FIG. 4 is a cross-sectional view of the essential portions of Embodiment 2 of the present invention.

FIGS. 3 and 4 are cross-sectional views of the essential portions of Embodiments 1 and 2, respectively, of the present invention. In these figures, the same elements as those shown in FIG. 1 are given the same reference characters.

Embodiments 1 and 2 are characterized in that, for example, in the construction of the example of the prior art shown in FIG. 1, interrupting means comprising a lens system 81 or a stop 91 for preventing the unnecessary light of the light beam 10 light-modulated by the second scale 3b from entering each light receiving element is provided in the optical path from the first scale 3a to the light receiving means 4.

The unnecessary light refers to a light beam entering the other light receiving element than the light receiving elements to which the three light beams light-modulated by the second scale 3b are directed, that is, a light beam which provides noise to the output signal from the received light beam.

Description will now be made of the principle of rotation detection of Embodiments 1 and 2.

A grating 3d, as shown in FIG. 5, comprises V-grooves (V-groove portions) each having two inclined surfaces long in a direction perpendicular to the direction of rotation of the optical scale 3 indicated by arrow 3f (the direction of the rotary axis) and inclined in opposite directions, and curved surface portions (hereinafter referred to as "flat surface portions") substantially approximate to a flat surface having a slight curvature based on a cylindrical shape.

FIGS. 5A and 5B are detailed views of the grating of the optical scale 3, and as shown there, the V-groove portions 30b-1, 30b-2 and the flat surface portions 30a are alternately arranged to form the grating. In the inner side surface of a cylindrical member 3c, n V-grooves are arranged at equal intervals at a pitch P in the circumferential direction thereof. The width of the V-grooves is ½·P, and the two flat surface portions forming each V-groove has a width of ¼·P, and each inclined surface is inclined by a critical angle or greater, in the present embodiments, θ=45°, with respect to a straight line linking the bottom and center of the V-groove.

The interval D along the optical axis between the first scale (first area) 3a and the second scale (second area) 3b of the optical scale 3 (the inside diameter of the optical scale) is set so as to satisfy the following conditions in the present embodiments:

$D = N \cdot P^2/\lambda$   (N being a natural number)
$P = \pi D/n$   (n being the total number of slits)

where P is the pitch of the grating, and λ is the wavelength.

By so setting the diameter D of the optical scale 3, the image of the grating in the first area 3a on the side of the optical scale 3 is directly projected onto the grating in the second area 3b. The projected grating image is what is called a Fourier image, and is created by the self-imaging action of the grating resulting from a light diffracting phenomenon.

In the present embodiments, the material of the optical scale 3 is plastic so that the optical scale can be easily made by a manufacturing method such as injection molding or compression molding.

The light beam from the semiconductor laser 1 is converted into a convergent light beam by adjusting the position of the lens system 2, and this convergent light beam is caused to enter the first scale (first area) of the optical scale 3. The reason why the light beam from the semiconductor laser is converted into a convergent light beam is that the side portion of the optical scale 3 has refractive power corresponding to that of a concave lens due to the curvature difference between the outer side and the inner side, and the light which has entered the optical scale 3 becomes substantially parallel light by the concave lens action.

As regards this convergent light beam, in the grating 3d of the first area 3a, as shown in FIG. 5A, the ray which has arrived at a grating portion 30a passes through the grating portion 30a into the cylinder. Since the inclined surfaces are set to the critical angle or greater, the ray which has arrived at the surface of the grating portion 30b-1 is totally reflected and directed to the surface of the grating portion 30b-2 and is also totally reflected by the surface of the grating portion 30b-2, as shown, and therefore, after all, the ray which has arrived at the surface of the grating portion 30b-1 does not travel into the interior of the cylindrical member of the optical scale 3, but is returned substantially in the direction of incidence. Likewise, the ray which has arrived at the surface of the grating portion 30b-2 is repetitively totally reflected and returned.

Thus, the light beam arriving at the range of the two inclined surfaces 30b-1 and 30b-2 forming the V-groove in the first area 3a does not travel into the cylindrical member but is reflected, and only the ray which has arrived at the grating portion 30a travels into the interior of the cylindrical member. That is, the V-groove-shaped grating 3d in the first area 3a has an action similar to that of a transmission type amplitude diffraction grating.

The light beam is diffracted by this grating 3d in the first area 3a and 0-order, ±1st-order, ±2nd-order, . . . diffracted lights are created, and as the result of the interference between two or three of 0-order light and ±1st-order lights, the Fourier image of the grating in the first area 3a is formed within the optical scale 3. The Fourier image is repetitively formed rearwardly of the grating surface with a distance L as the basis at a location positive integer times as far as the distance L.

In the present embodiments, the wavelength of the light source, the grating pitch P and the location of the lens system 2 are set so that the third (N=3) Fourier image may be formed on the grating surface in the second area 3b. The light-and-shade pitch of this Fourier image becomes equal to the pitch P of the V-grooves which are the grating 3d in the first area 3a and the second area 3b.

The light beam incident on the surface 30a in the second area 3b is incident thereon substantially perpendicularly thereto as shown in FIG. 5B and therefore is rectilinearly transmitted therethrough and arrives at the photodetector 4c. Also, the rays which have arrived at the two inclined surfaces 30b-1 and 30b-2 forming the surface of the V-groove are incident on the respective surfaces at an angle of incidence of 45° and therefore are greatly refracted in different directions and arrive at the photodetectors 4a and 4b, respectively.

As described above, in the second area 3b, the light beams travel separately in three directions by total three kind of surfaces differing in direction of inclination, i.e., the two inclined surfaces inclined in different directions with respect to the incident light beam and the flat surface between adjacent V-grooves, and arrive at the photodetectors 4a, 4b and 4c provided at locations corresponding to the respective surfaces. That is, in the second area 3b, the V-groove grating functions as a light wave surface dividing element.

When the optical scale 3 is rotated, the quantity of light detected by each of the photodetectors 4a, 4b and 4c varies. The balance of the quantities of light incident on the respective photodetectors varies in conformity with the relative displacement of the location of the grating and the location of the Fourier image and if as a result, the optical scale is rotated counter-clockwise, there will be obtained such a variation in quantity of light resulting from the rotation of the optical scale 3 as shown in FIG. 6A.

Figure 6A:
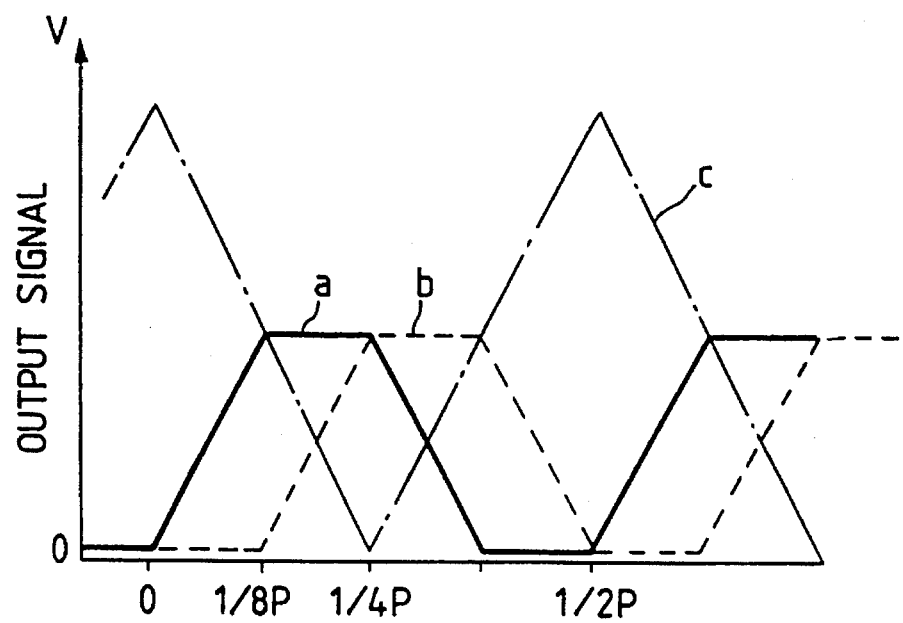
FIGS. 6A and 6B are illustrations of output signals from the light receiving means of FIG. 3.

In FIG. 6A, the horizontal axis represents the amount of rotation of the optical scale 3 and the vertical axis represents the quantity of received light. Signals a, b and c correspond to the photodetectors 4a, 4b and 4c, respectively. When the optical scale 3 is rotated clockwise, signals a, b and c become the outputs of the photodetectors 4b, 4a and 4c, respectively. The direction of rotation can be discriminated by this difference.

Figure 6B:
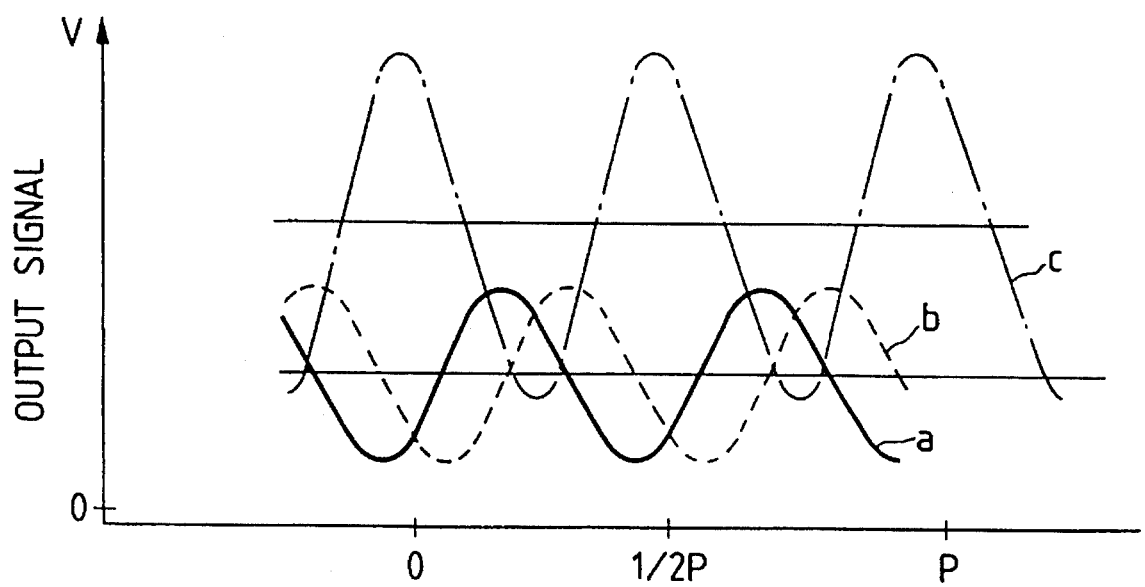

FIG. 6A shows the state of the theoretical variation in quantity of light when the contrast of the Fourier image is very high and approximate to ideal, and actually the contrast of the Fourier image is lower and therefore, as shown in FIG. 6B, each quantity of light varies in a substantially sine wave fashion. On the basis of these signals, rotation information such as the angle and amount of rotation or the rotational speed and rotational acceleration of the optical scale 3 (the rotary member 6) is obtained in the signal processing circuit 5.

The details of the present embodiments will now be described. The optical path of the light beam incident on each light receiving element when the interrupting means according to the present invention is not used is shown in FIGS. 7A to 7C and 8A to 8C.

Figure 7A:
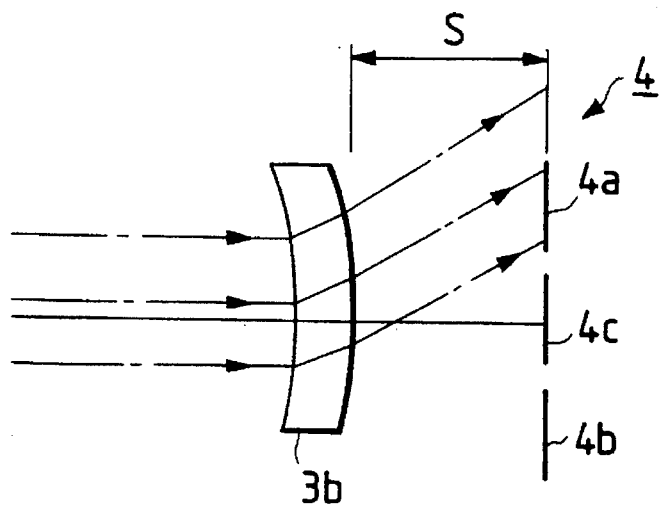
FIG. 7A, 7B and 7C are illustrations of a portion of the prior-art rotary encoder utilizing Talbot interference.
Figure 7B:
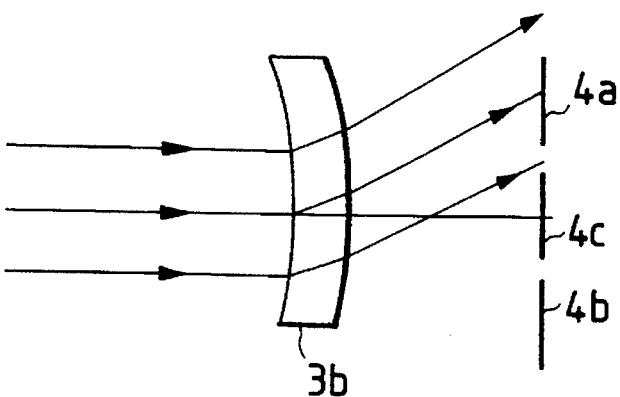
Figure 7C:
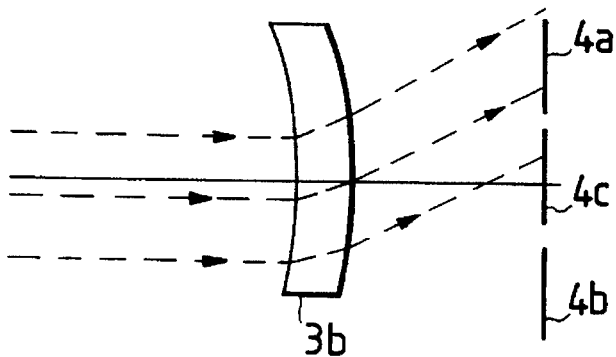
Figure 8A:
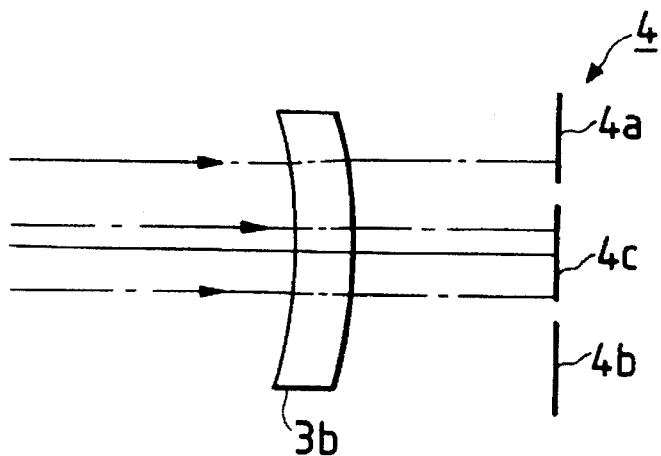
FIGS. 8A, 8B and 8C are illustrations of a portion of the prior-art rotary encoder utilizing Talbot interferenc.
Figure 8B:
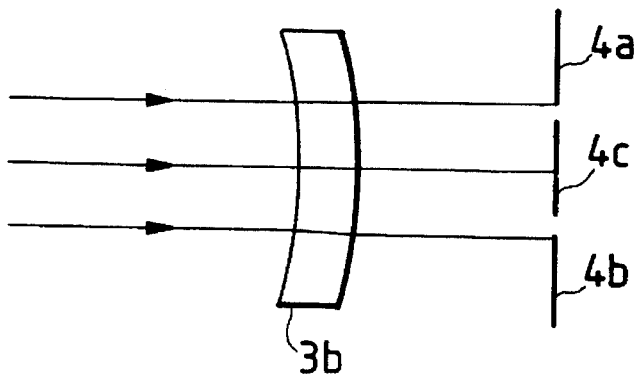
Figure 8C:
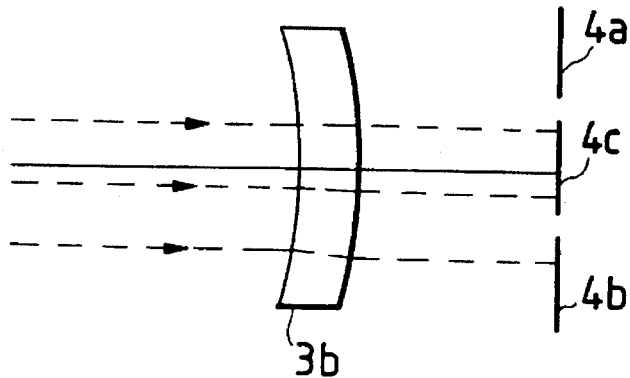

FIGS. 7A through 8C show an example of the state of superposition of the light beams 0-order light and ±1st-order lights between the second scale 3b and the light receiving means 4 in the example of the prior art represented by FIG. 1. FIGS. 7A to 7C show the light beams light-modulated by the second scale 3b and travelling toward the light receiving element 4a, and FIGS. 8A to 8C show the light beams light-modulated by the second scale 3b and travelling toward the light receiving element 4c.

Also, in FIGS. 7A, 7B, 7C, 8A, 8B and 8C, there are separately shown the states in which of the light beams light-modulated (diffracted) by the first scale 3a, +1st-order light, 0-order light and -1st-order light are light-modulated by the second scale 3b and are incident on the respective light receiving elements. Actually, 0-order light and ±1st-order lights are incident on the respective light receiving elements in their superposed state.

The optical path of the light beam incident on the light receiving element 4b is symmetrical with the optical path of the light beam incident on the light receiving element 4a and is therefore not shown.

As shown in FIGS. 7 and 8, when the interrupting means is not used, it is supposed that in some cases, on the light receiving surfaces 4a, 4b and 4c of the light receiving means 4 placed at a distance S from the second scale 3b, each light beam is inserted into the other light receiving surface than the light receiving surface corresponding thereto. This may affect the S/N of the waveform of the signal output from the light receiving means and reduce the contrast.

To prevent this, it becomes necessary to increase the distance S and widen the light receiving surfaces to thereby separate the superposition of the light beams. There is also a method of reducing the diameter of the light beam from the light applying means LR and decreasing the superposed portions of the light beams. However, these methods cause a reduction in contrast.

So, in Embodiment 1 shown in FIG. 3, interrupting means 81 comprising a lens 81 having positive refractive power is disposed between the second scale 3b and the light receiving means 4 to thereby condense each light beam travelling toward the light receiving means 4.

In this case, $S \simeq 2f$ (f: the focal length of the lens 81). By doing so, the accuracy of the set position of the distance S becomes loose and it becomes possible to make the area of the light receiving surface small.

In this embodiment, use is made of the interrupting means 81 comprising such a lens system to thereby prevent unnecessary light from entering the light receiving elements.

Figure 9A:
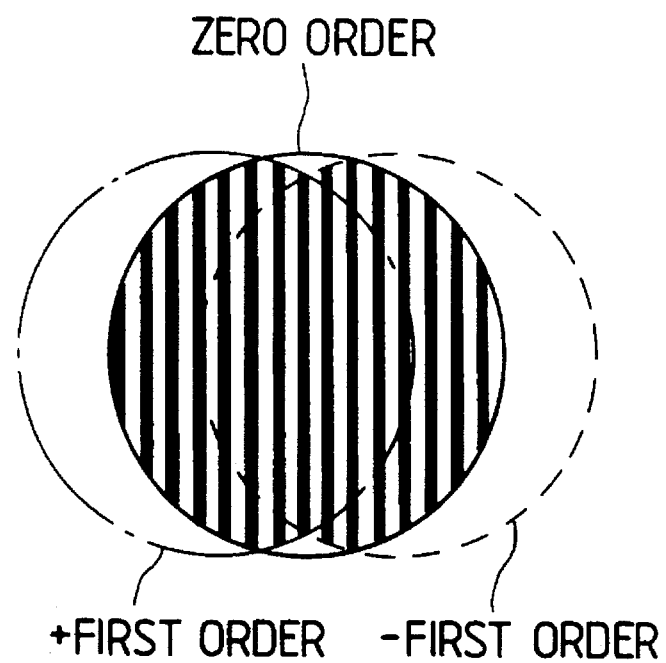
FIGS. 9A and 9B are illustrations of the interrupting means of FIG. 4.
Figure 9B:
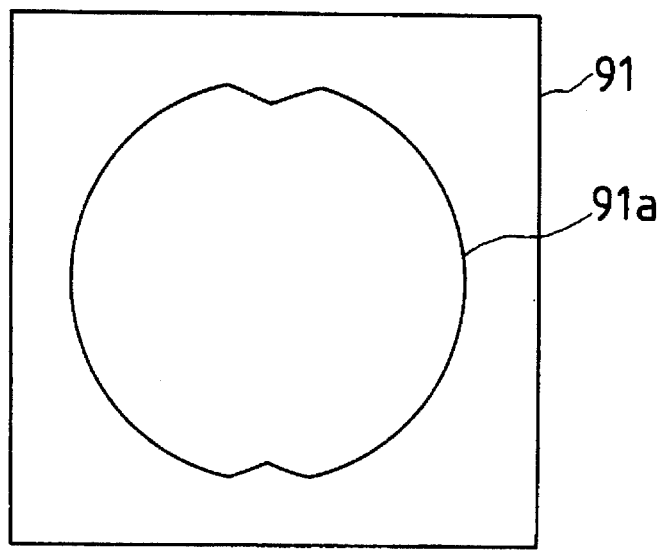

In Embodiment 2 shown in FIG. 4, interrupting means 91 comprising a stop of a predetermined opening is disposed forwardly of the second scale 3b. The interrupting means 91 in this embodiment has such an opening 91a as shown in FIG. 9B which will interrupt the area in which as shown in FIG. 9A, interference fringes of ± first-order do not appear in the second scale 3b.

Figure 10A:
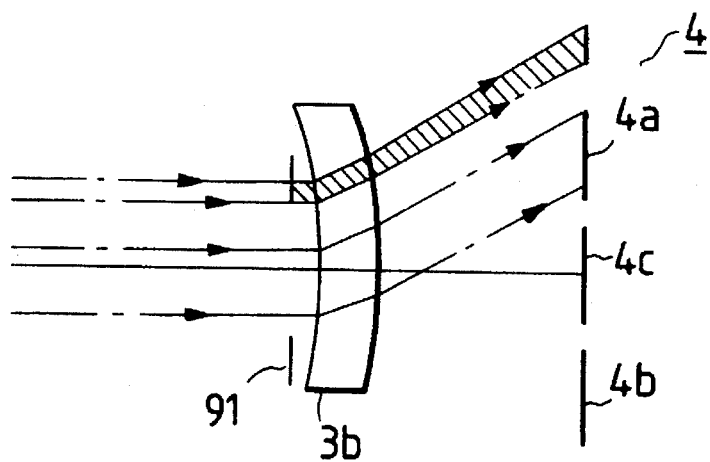
FIGS. 10A, 10B and 10C are enlarged illustrations of a portion of FIG. 4.
Figure 10B:
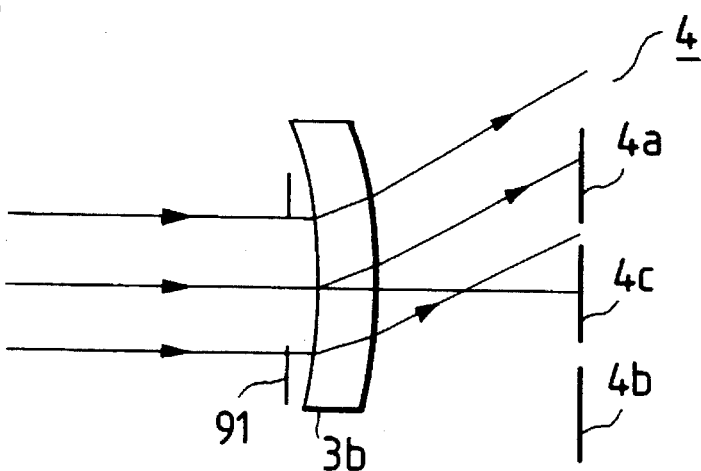
Figure 10C:
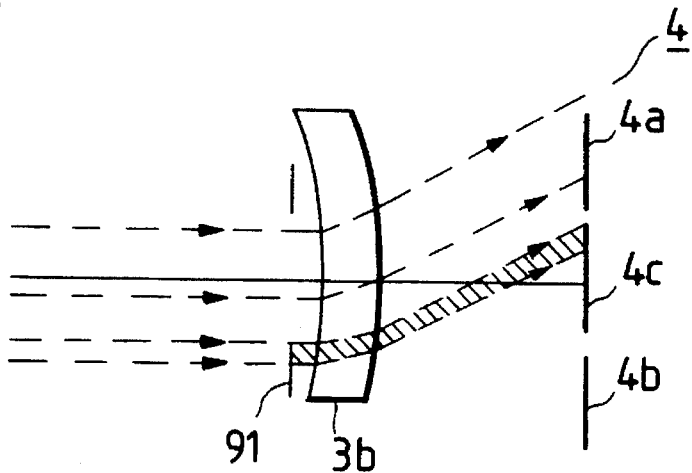
Figure 11A:
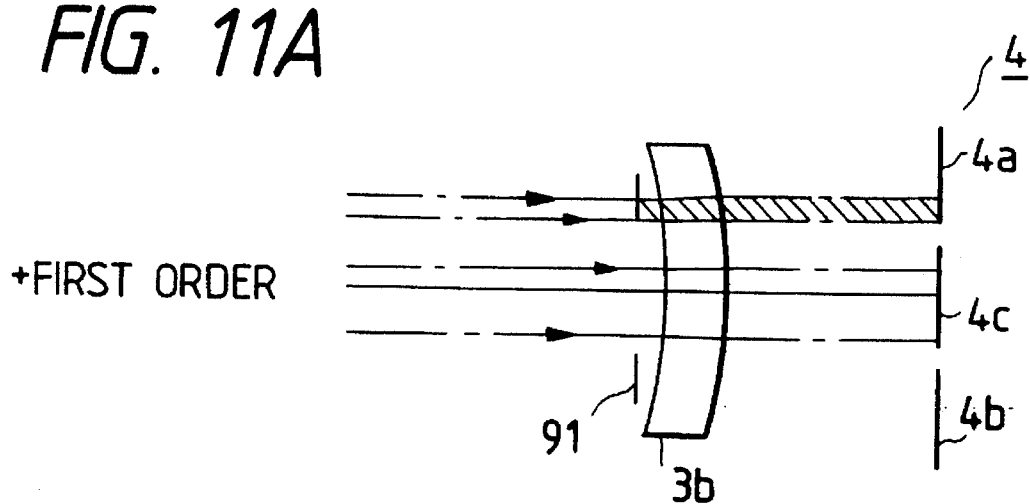
FIGS. 11A, 11B and 11C are enlarged illustrations of a portion of FIG. 4.
Figure 11B:
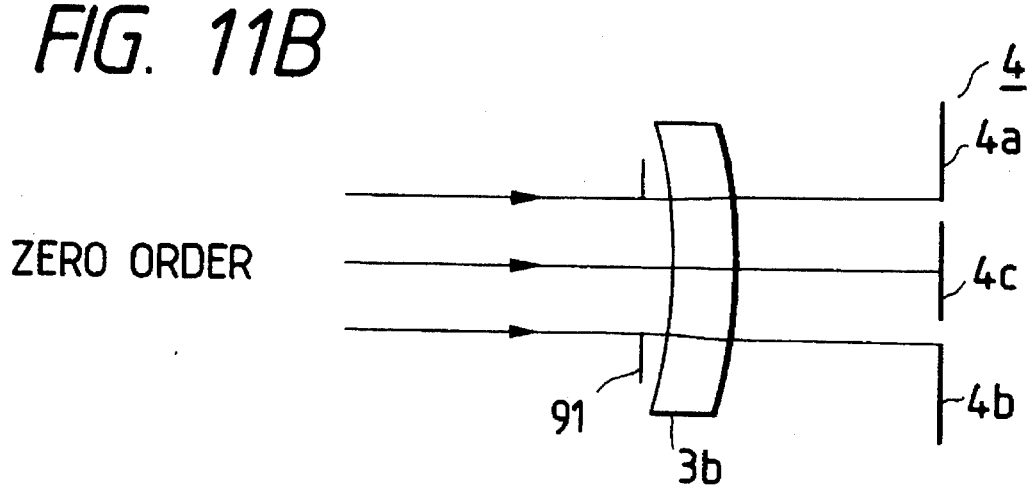
Figure 11C:
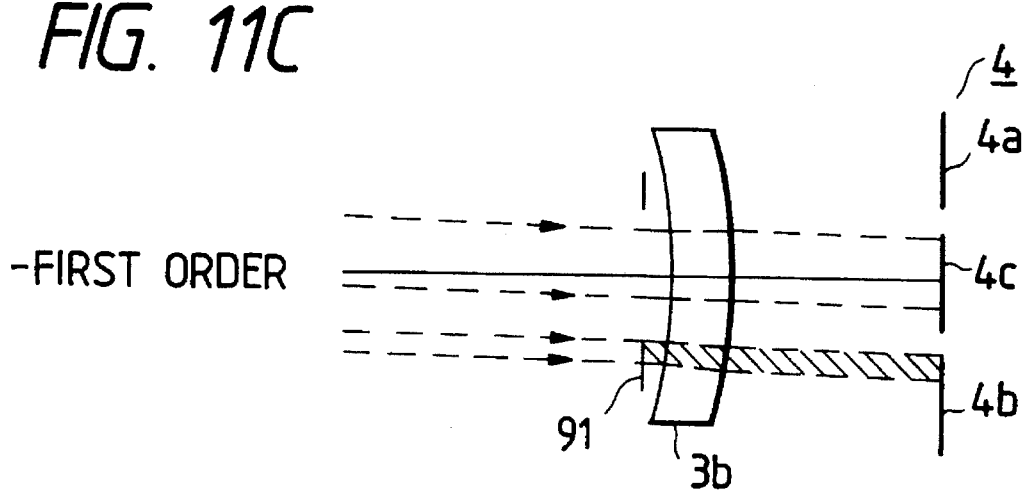

FIGS. 10A through 11C show the optical paths of the light beams incident on the respective light receiving elements when use is made of the interrupting means 91 comprising a stop, in the same manner as FIGS. 7A through 8C. FIGS. 10A to 10C show the light beams incident on the light receiving element 4a, and FIGS. 11A to 11C show the light beams incident on the light receiving element 4c.

The light beams indicated by hatching in FIGS. 10A through 11C are light beams interrupted by the stop (interrupting means) 91. As shown, in this embodiment, unnecessary light is effectively prevented from entering the other light receiving elements by the interrupting means 91.

In this embodiment, such interrupting means is used to thereby improve the S/N ratio of the output signal from the light receiving means 4 and obtain good contrast.

The encoders of embodiments which will hereinafter be described are characterized in that a light beam of a reference wavelength $\lambda_0$ from the light source of light applying means having a lens system is applied to a first scale of the optical scale of a moving member provided with an optical scale comprising a grating of a pitch P of a predetermined period, the light beam light-modulated by said first scale is caused to enter a second scale of said optical scale, the light beam light-modulated by the second scale is received by light receiving means, and when the movement information of said moving member is detected by the use of a signal from said light receiving means, if the focal length temperature coefficient of said lens system is $\alpha$ and the wavelength temperature coefficient of said light source is $_\gamma$ and the coefficient of linear expansion of a support member for supporting said light applying means is $\beta$ and the natural number is N and the amount of variation in environmental temperature is $\Delta t$, the condition that $$\lambda_0/\{(N + \frac{1}{3})P^2\} \leq (\lambda_0 + \gamma \cdot \Delta t)/(N \cdot P^2) -$$

$$(\alpha - \beta)\Delta t/\{(1 + \alpha \cdot \Delta t)(1 + \beta \cdot \Delta t)f_0\} \leq \lambda_0/\{(N - \frac{1}{3})P^2\}$$

is satisfied, and particularly in that each element is set so that said natural number N may be N≦22, said pitch P is comprised of 15μ≦P≦50 μ, and the grating of said optical scale is of an uneven shape having an inclined surface for light-modulating the incident light beam along the direction of movement.

Figure 12:
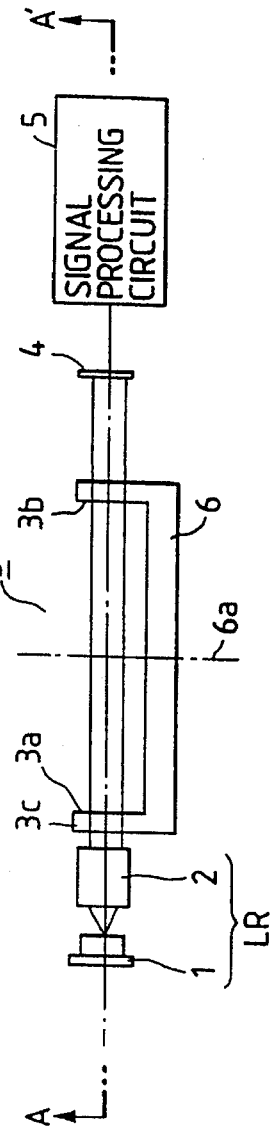
FIG. 12 is, a cross-sectional view of Embodiment 3 of the present invention.
Figure 13:
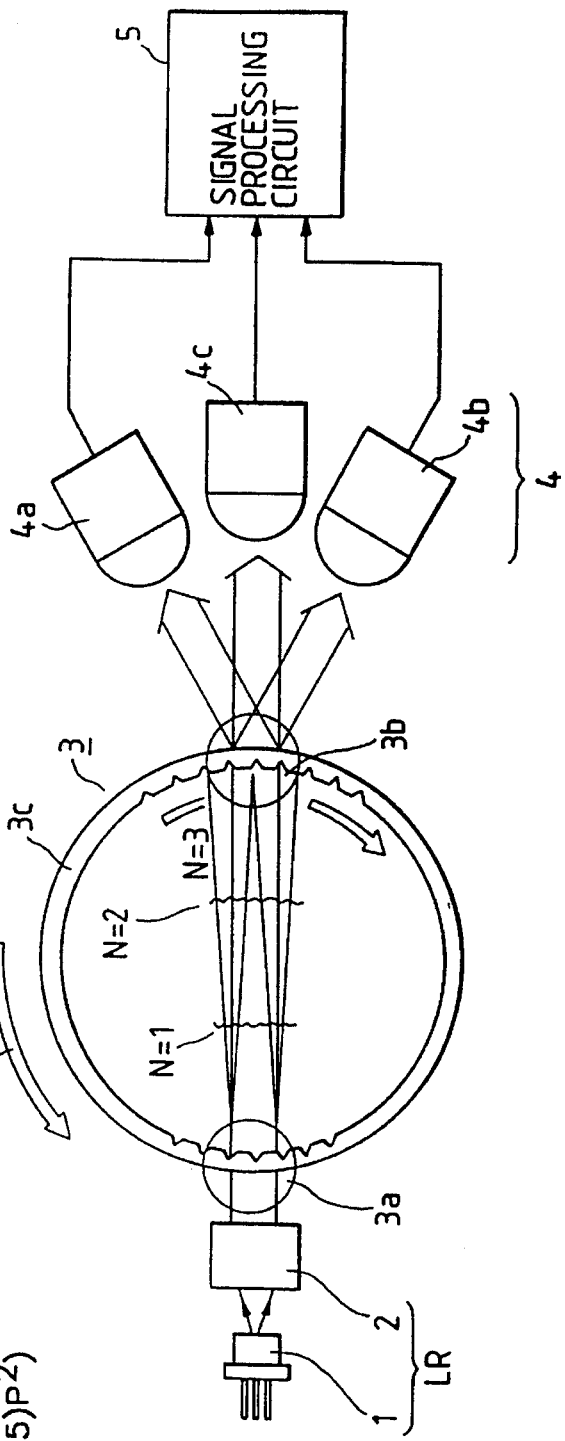
FIG. 13 is a plan view of the essential portions of FIG. 12.

FIG. 12 is a cross-sectional view of the essential portions of Embodiment 3 of the present invention, and FIG. 13 is a cross-sectional view of various elements for the detection of the rotation information of the rotary member 6 (optical scale 3) of FIG. 12 taken along line A–A' of FIG. 12. The cross-sectional view of the essential portions of the optical scale 3 in the present embodiment which will be described later is similar to FIG. 5.

In these figures, LR designates light applying means having a semiconductor laser 1 and a lens 2. The reference numeral 3 denotes an optical scale comprising a plurality of gratings (grating portions) 3d provided on the inner or outer peripheral surface of a cylindrical member 3c at a predetermined period of a grating pitch P. The optical scale 3 is formed of a light transmitting optical material, for example, plastic, and is provided as a part of a rotary member 6 and is rotated about a rotational axis 6a with the rotary member 6.

The reference numeral 4 designates light receiving means having three photodetectors (light receiving elements) 4a, 4b and 4c for receiving three light beams, respectively, light-modulated by the optical scale 3 and emerging therefrom. The reference numeral 5 denotes a signal processing circuit having a pulse counting circuit, a discrimination circuit for the direction of rotation and a signal interpolation processing circuit. The signal processing circuit 5 detects the rotation information of the optical scale by the use of a signal from the light receiving means 4.

A method of detecting the rotation information of the optical scale 3 (rotary member 6) in the present embodiment is similar to that described in Embodiment 1 and need not be described.

Figure 14:
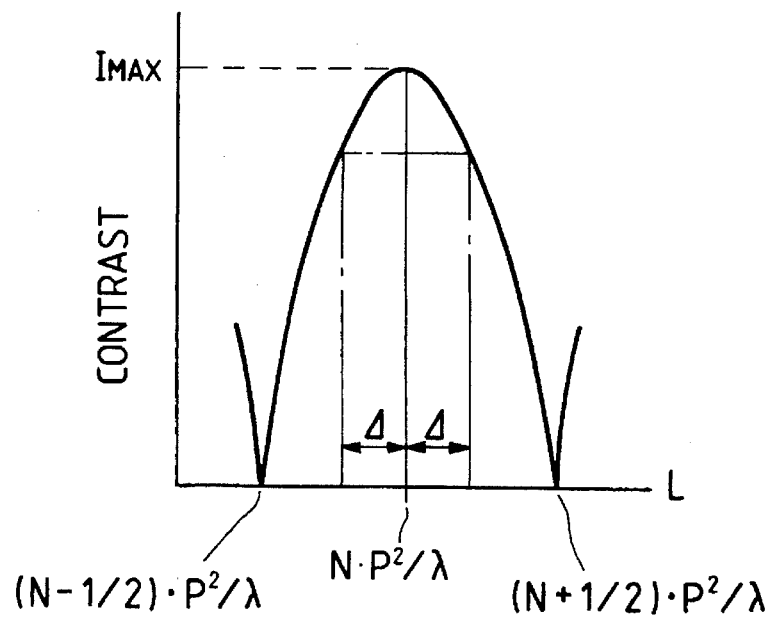
FIG. 14 is illustrates the contrast of Talbot interference fringes obtained in the present invention.

FIG. 14 shows a variation in the contrast of interference fringes near a second scale 3b of the optical scale 3 when collimated light emitted from the light applying means LR is incident on a first scale 3a of the optical scale 3 and is subjected to light modulation and forms interference fringes of the same periodicity as that on the first scale by Talbot interference on the second scale 3b when the diameter of the optical scale 3 is D and the wavelength of the light beam from the laser diode 1 which is a light source is $\lambda$ and the pitch of the gratings 3d is P (but there is the relation that $D = N \cdot P^2/\lambda$ (N: natural number)).

In Talbot interference, with $P^2/\lambda$ as one cycle, the contrast of interference fringes becomes highest each positive integer times the length thereof, and the contrast becomes lowest intermediately of one cycle of $p^2/\lambda$. Accordingly, when the distance from the first scale 3a on which the interference fringes by Talbot interference are formed is L, the signal output of the most appropriate rotation information is obtained when $L = N \cdot P^2/\lambda$, that is, L coincides with the diameter D of the cylindrical optical scale 3.

When in such a construction, the wavelength $\lambda$ of the laser diode 1 which is the light source is varied by the variation At in environmental temperature, the distance L varies and the interference fringes are formed at a location deviating relative to the diameter D and therefore, interference fringes reduced in contrast are located near the second scale 3b for the reason set forth above, and as a result only the output of deteriorated rotation information is obtained.

Here, from $L = N \cdot P^2/\lambda$ and $D = n/\pi \cdot P$ (n: total number of slits), $$\theta L/\theta t = N \cdot (-P^2/\lambda^2 \cdot \theta\lambda/\theta t + 2P/\lambda \cdot \theta P/\theta t)$$

$$\theta D/\theta t = n/\pi \cdot \theta P/\theta t$$

and it is effective to minimize the difference ($\Delta$) of $\theta L/\theta t - \theta D/\theta t$.

$$\theta L/\theta t - D\theta t = -N \cdot P^2/\lambda^2 \cdot \theta\lambda/\theta t + (N \cdot 2P/\lambda - n/\pi)\theta P/\theta t \quad (1)$$

Here, the variation in the wavelength of the laser diode 1 which is the light source for the variation in temperature is generally of the order of 0.3 nm/° C., and if the plastic material forming the cylindrical optical scale 3 is composed of polycarbonate which is small in coefficient of linear expansion (coefficient of linear expansion: 7.0E-5 mm/° C.) or the like, it may be considered that in the medium pulse area of n: 500–5000, $$\theta P/\theta t = \pi/n \cdot \theta/\theta D = 4.4E\text{-}5 \sim 4.4E\text{-}4 \text{ nm/°C}. \quad (2)$$

and therefore, it can be said to be very small as compared with $\theta\lambda/\theta t = 0.3$ nm/° C. Accordingly, $\Delta$ is attributable chiefly to the variation in, wavelength by temperature, and it becomes necessary to determine the range of use of the order number N which takes this variation into account.

In the contrast variation graph of the interference fringes near the second scale 3b shown in FIG. 14, the contrast is lowest at a position far from the diameter D of the cylindrical optical scale 3 by $(N-\frac{1}{2}) \cdot P^2/\lambda$ or $(N+\frac{1}{2}) \cdot P^2/\lambda$ with $L = N \cdot P^2/\lambda$ as the center. If the allowable amount of $\Delta$ is a 20% reduction relative to the maximum value $I_{MAX}$ of the contrast when D=L, $$\Delta = \frac{1}{5} \cdot P^2/\lambda \quad (3)$$

and from equations (1), (2) and (3), $$|\theta L/\theta t - \theta D/\theta t| \cong N \cdot P^2/\lambda^2 \cdot \theta\lambda/\theta t \cdot \frac{1}{5} \cdot$$

$$P^2/\lambda \leq N \cdot P^2/\lambda^2 \cdot \theta\lambda/\theta t \cdot 25$$

$$\therefore \theta\lambda/\theta t \leq \lambda/(N \cdot 5 \cdot 25)$$

because it may be considered that the wavelength of the laser diode 1 which is the light source is usually 850 nm or less and the range of the variation in temperature is generally ±25° C. relative to ordinary temperature 25° C.

Accordingly, it will be seen that $N \leq 22$ is suitable for the condition that $\theta\lambda/\theta t = 0.3$ nm/° C.

In the present embodiment, the value of N is set appropriately like this and highly accurate rotation information is obtained.

When the coefficient of linear expansion of polycarbonate for a variation in humidity is $\eta$, $\eta$ is $\eta = 6.6E\text{-}4$ to $\Delta = N \cdot P^2/\lambda \cdot \eta(1+\eta)$, and under the above-mentioned condition, the influence thereof can be said to be small as compared with the variation is L by the variation in the wavelength $\lambda$ by temperature.

Figure 15:
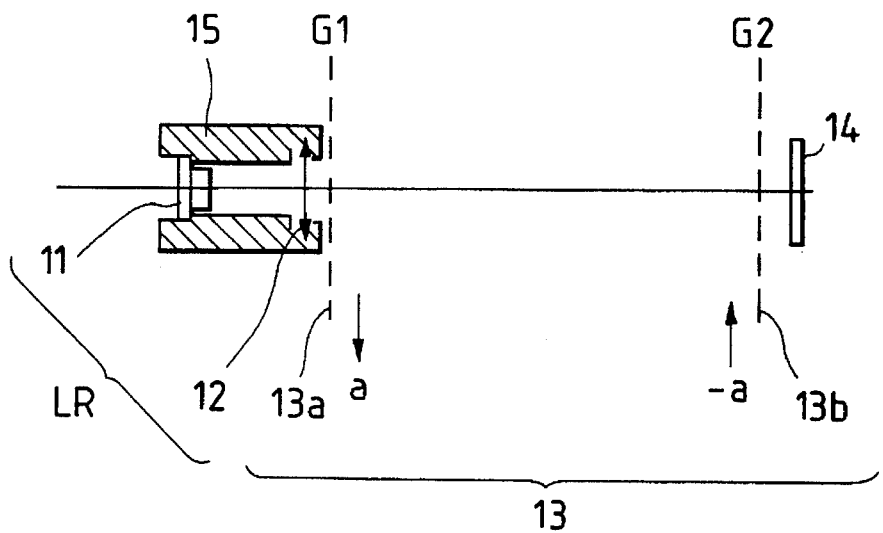
FIG. 15 is a cross-sectional view of Embodiment 4 of the present invention.
Figure 16:
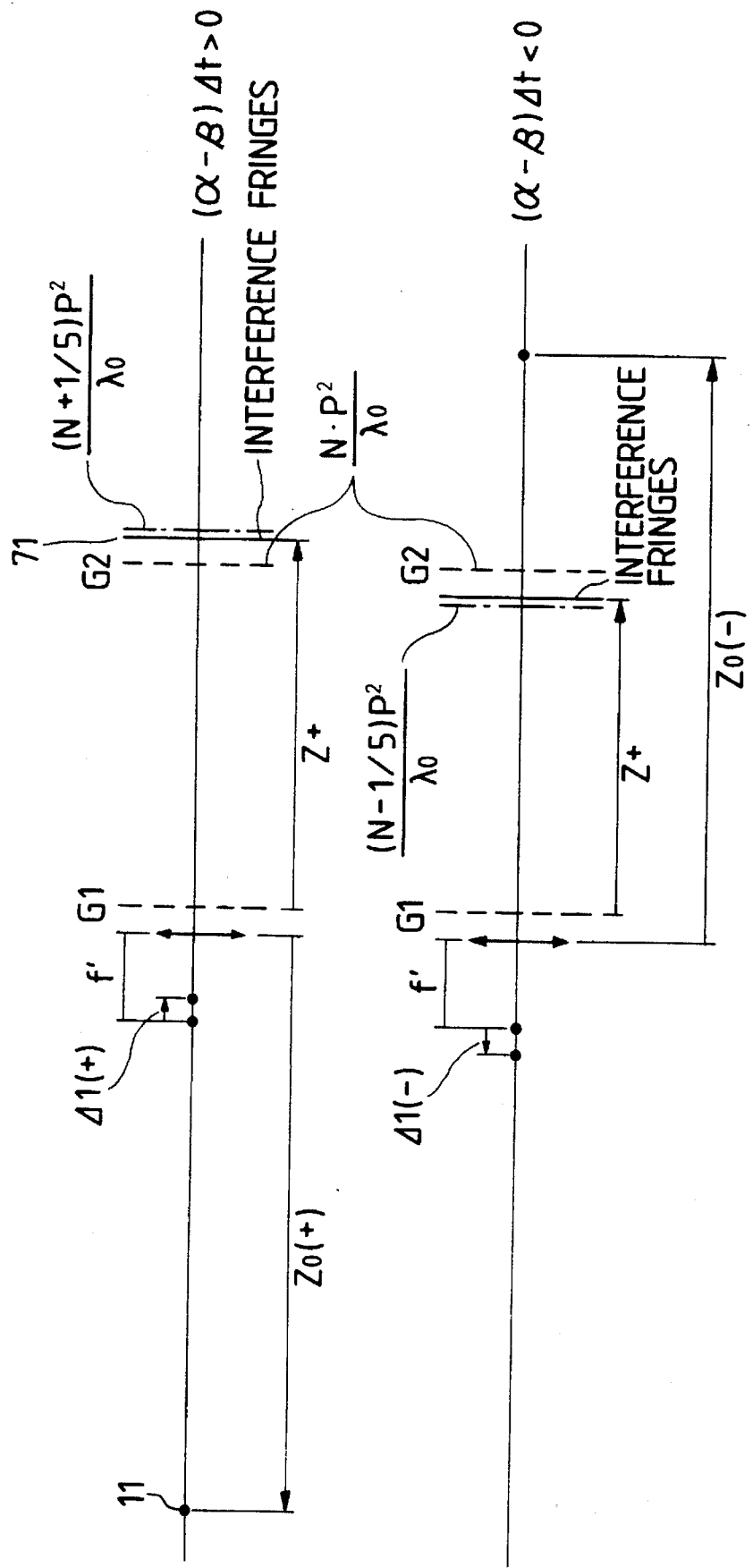
FIG. 16 is an enlarged illustration of a portion of FIG. 15.

FIG. 15 is a cross-sectional view of the essential portions of Embodiment 4 of the encoder utilizing Talbot interference for more specifically illustrating the condition setting in the above-described embodiment, and FIG. 16 is an enlarged illustration of a portion of FIG. 15.

The description of the encoder of the present embodiment is directed to both of the detection of the movement information of a linearly moving body and the detection of the rotation information of a rotating body, and is equally applicable to the above-described rotary encoder of FIG. 13.

In FIG. 15, LR designates light applying means having a light source 11 such as a laser diode emitting a light beam of a wavelength $\lambda_0$ and a lens system (in the figure, expressed as a thin system) 12 of a focal length $f_0$. The reference numeral 13 denotes an optical scale having a first scale (G1) comprising a grating of grating pitch P at a location 13a and a second scale (G2) comprising a grating also of grating pitch P at a location 13b. The reference numeral 14 designates light receiving means having three light receiving elements as in Embodiment 3.

In the present embodiment, a light beam of plane wave enters from the light applying means LR toward the first scale (G1). The light beam light-modulated (diffracted) by the first scale (G1) forms interference fringes comprising the same periodicity as that of the first scale (G1) at a location 71 of
$Z_+ = N \cdot P^2/\lambda_0$ (N being a natural number), where $Z_+$ is the distance rearward of the first scale (G1).

Also, at this location 71, there is placed the second scale (G2) comprising the same grating constant P as that of the first scale (G1). When the first scale (G1) is moved in a direction a, the second scale (G2) is moved in the opposite direction −a (for example, in the case of the cylindrical scale in FIG. 13) or fixed, whereby the light beam light-modulated by the second scale (G2) is directed to the light receiving means 14 provided rearwardly of the second scale (G2). Thereby, a signal output conforming to the amount of movement of the first scale (G1) is obtained from the light receiving means 14.

In such a construction, the wavelength $\lambda_0$ of the light beam from the light source 11 or the focal length $f_0$ of the lens 12 is varied by any variation in environmental temperature and the spacing from the light source to the lens 12 is varied by the thermal expansion of a support member 15 for supporting the light source 11 and lens 12, whereby an interference image to be formed at the location 71 of said distance $Z_+$ is formed at a different location and, thus, interference fringes reduced in contrast are located near the second scale (G2). As a result, only the signal output of the deteriorated movement information of the first scale (G1) is obtained.

In the present embodiment, such a change in the location 71 of the distance $Z_+$ by any variation in temperature or the like is minimized by setting each element appropriately as follows and also the full length of the light applying means LR is set appropriately.

Assuming that the focal length after a temperature variation $\Delta t$ in the focal length $f_0$ of the lens 12 is f' and $\theta n/\theta t$ is the refractive index temperature coefficient of the lens 12 and $\alpha'$ is the coefficient of linear expansion of the lens 12 and $$\theta f_0/\theta t = f_0\{-1/(n-1) \cdot \theta n/\theta t + \alpha'\}$$
$$= f_0 \cdot \alpha$$

then $$f' = (1+\alpha \cdot \Delta t)f_0 \quad (4)$$

The wavelength after the temperature variation $\Delta t$ in the wavelength $\lambda_0$ of the light beam from the light source 11 is $\lambda'$ and $\gamma$ is the wavelength temperature coefficient, and $\lambda'$ is defined as $$\lambda' = \lambda_0 + \gamma \cdot \Delta t \quad (5)$$

When the coefficient of linear expansion of the support member 15 is $\beta$, the variation in the spacing from the light source 11 to the lens after the temperature variation $\Delta t$ is $$(1+\beta \cdot \Delta t)f_0 \quad (6)$$

Also, when the deviation of the light source 11 from the focal position of the lens after the temperature variation $\Delta t$ is $\Delta L$, the distance $Z_0$ to the light source 11 as viewed from the first scale (G1) is $$Z_0 = f' \cdot (f' - \Delta L)/\Delta L \quad (7)$$

(It is to be understood that the spacing between the first scale G1 and the lens 12 is sufficiently small relative to $Z_0$).

From expressions (4) and (6), $$\Delta L = (\alpha - \beta) \Delta t \cdot f_0$$

and accordingly, the distance $Z_0$ of equation (7) is $$Z_0 = (1+\alpha \cdot \Delta t)(1+\beta \cdot \Delta t)f_0/(\alpha-\beta)\Delta t \quad (8)$$

Also, the distance $Z_+$ and $Z_0$ after the temperature variation $\Delta t$ has the following relation:

$$1/Z_0 + 1/Z_+ = \lambda'/(N \cdot P^2)$$

From equation (5), $$1/Z_+ = \lambda'/(N \cdot P^2) - 1/Z_0 = (\lambda_0 + \gamma \cdot \Delta t)/(N \cdot P^2) - \quad (9)$$

$$(\alpha - \beta)\Delta t/\{(1+\alpha \cdot \Delta t)(1+\beta \cdot \Delta t)f_0\}$$

With the reduction in the contrast near the second scale (G2) taken into account, in the present embodiment, the tolerance of the distance $Z_+$ from the location at which the interference fringes after the temperature variation $\Delta t$ are formed is within $\pm 1/5 \cdot P^2/\lambda_0$ with $N \cdot P^2/\lambda_0$ as the center, and optimum $f_0$ is determined by the conditions of $\lambda_0$, P and N so that $$(N-1/5)P^2/\lambda_0 \leq Z_+ \leq (N+1/5)P^2/\lambda_0 \quad (10)$$

Here, the lens 12 is generally made of glass or resin, and the coefficient of linear expansion of the support member 15 is generally of the order of $10^{-5}$ mm/°C.

The examples of the lens 12 when made of glass and of resin and the support member 15 are shown in the table below.

TABLE 1

| | α (mm/°C.) | | β (mm/°C.) |
|---|---|---|---|
| BAL35 | $3.0 \times 10^{-6}$ | Al (industrial) | $2.7 \times 10^{-5}$ |
| PC | $3.0 \times 10^{-4}$ | | |

Also, when the light source 11 is a laser diode, if $\gamma$ is the wavelength temperature coefficient thereof, $\gamma = 0.3 \times 10^{-6}$ mm/°C.

In equation (8), when $(\alpha-\beta)\Delta t > 0$, $Z_0 > 0$ and therefore, relative to the location $(N \cdot P^2/\lambda_0)$ of the second scale (G2), the distance $Z_+$ to the location at which the interference fringes are formed which is shown in equation (9) shifts toward the side opposite to the first scale (G1), i.e., toward $(N+1/5)P^2/\lambda_0$ in expression (10), and when $(\alpha-\beta)\Delta t < 0$, $Z_0 < 0$ and therefore, the distance $Z_+$ shifts toward the first scale G1 side i.e., toward $(N-1/5)P^2/\lambda_0$ in expression (10). This state is shown in FIG. 16.

From expressions (9) and (10), $$\lambda_0/\{(N+1/5)P^2\} \leq (\lambda_0 + \gamma \cdot \Delta t)/(N \cdot P^2) - \quad (11)$$

$$(\alpha-\beta)\Delta t/\{(1+\alpha \cdot \Delta t)(1+\beta \cdot \Delta t)f_0\} \leq \lambda_0/\{(N-1/5)P^2\}$$

When in this expression (28), $(\alpha-\beta)\Delta t < 0$, $$f_0 \leq (\alpha-\beta)\Delta t/\{(1+\alpha \cdot \Delta t)(1+\beta \cdot \Delta t)\} \cdot P^2/U,$$

where $U = (\lambda_0 + \gamma \cdot \Delta t)/N - \lambda_0/(N-1/5)$.

Accordingly, from the fact that the focal length $f_0$ of the lens 12 is $f_0 > 0$, it is necessary that $U < 0$.

When it is considered that the wavelength $\lambda_0$ of the light beam from the light source is usually 850 nm or less and the range of the temperature variation is generally $\Delta t = \pm 25°$ C. relative to ordinary temperature 25° C., $\gamma \cdot \Delta t/(\lambda_0 + \gamma \cdot \Delta t) < 1/(5N)$ and when with $\lambda_0 \gg \gamma$ taken into account, $\Delta t<0$, N is not limited, yet when $\Delta t>0$, $N<(\lambda_0+\gamma \cdot \Delta t)/(5 \cdot \gamma \cdot \Delta t)$ and thus, in the present embodiment, ∴$N \leq 22$ (N being a natural number).

Conditions for properly setting the entire system of the light applying means LR at this time under the condition that $N \leq 22$ are shown below. (Example 1) : Lens 12 made of glass When in expression (11), $\alpha = 3.0 \times 10^{-6}$ mm/°C., $\lambda_0 = 785 \times 10^{-6}$ mm/°C.

$\beta = 2.7 \times 10^{-5}$ mm/°C., $\Delta t = \pm 25°$ C.

$\gamma = 0.3 \times 10^{-6}$ mm/°C., (Example 1 – 1) when $P = 50\mu$,

◇ when $(\alpha - \beta)\Delta t > 0$, $1/48.408 \leq$ $(785 \times 10^{-6} + 0.3 \times 10^{-6} \cdot (-25))/(15 \cdot 0.05^2) -$ $(3.0 \times 10^{-6} - 2.7 \times 10^{-5}) \cdot (-25)/(1 + 3.0 \times 10^{-6} \cdot$ $(-25))/(1 + 2.7 \times 10^{-5} \cdot (-25))/f_0$ ◇ when $(\alpha - \beta)\Delta t < 0$, $(785 \times 10^{-6} + 0.3 \times 10^{-6} \cdot (+25))/(15 \cdot 0.05^2) -$ $(3.0 \times 10^{-6} - 2.7 \times 10^{-5}) \cdot (+25)/(1 + 3.0 \times 10^{-6} \cdot$ $(+25))/(1 + 2.7 \times 10^{-5} \cdot (+25))/f_0 \leq 1/47.134$ The value of $f_0$ which satisfies these two expressions is $f_0 \geq 7.96$.

(Example 1-2) when $P=15\mu$,

◇ when $(\alpha - \beta)\Delta t > 0$, $1/5.790 \leq (785 \times 10^{-6} + 0.3 \times 10^{-6} \cdot (-25))/(20 \cdot 0.015^2) -$ $(3.0 \times 10^{-6} - 2.7 \times 10^{-5}) \cdot (-25)/(1 + 3.0 \times 10^{-6} \cdot$ $(-25))/(1 + 2.7 \times 10^{-5} \cdot (-25))/f_0$ ◇ when $(\alpha - \beta)\Delta t < 0$, $(785 \times 10^{-6} + 0.3 \times 10^{-6} \cdot (+25))/(20 \cdot 0.015^2) -$ $(3.0 \times 10^{-6} - 2.7 \times 10^{-5}) \cdot (+25)/(1 + 3.0 \times 10^{-6} \cdot$ $(+25))/(1 + 2.7 \times 10^{-5} \cdot (+25))/f_0 \leq 1/5.675$ The value of $f_0$ which satisifes these two expressions is $f_0 \geq 9.93$.

(Example 2): Lens 12 made of resin

When in expression (11),
$\alpha = 3.010^{-4}$ mm/°C., $\lambda_0 = 785 \times 10^{-6}$ mm/°C.
$\beta = 2.7 \times 10^{-5}$ mm/°C., $\Delta t = \pm 25°$ C.
$\gamma = 0.3 \times 10^{-6}$ mm/°C.,
(Example 2-1) when $P = 50\mu$,
◇ when $(\alpha - \beta)\Delta t > 0$, $1/48.408 \leq (785 \times 10^{-6} + 0.3 \times 10^{-6} \cdot (+25))/(15 \cdot 0.05^2) -$ $(3.0 \times 10^{-4} - 2.7 \times 10^{-5}) \cdot (+25)/(1 + 3.0 \times 10^{-4} \cdot$ $(+25))/(1 + 2.7 \times 10^{-5} \cdot (+25))/f_0$ ◇ when $(\alpha - \beta)\Delta t < 0$, $(785 \times 10^{-6} + 0.3 \times 10^{-6} \cdot (-25))/(15 \cdot 0.05^2) -$ $(3.0 \times 10^{-4} - 2.7 \times 10^{-5}) \cdot (-25)/(1 + 3.0 \times 10^{-4} \cdot$ $(-25))/(1 + 2.7 \times 10^{-5} \cdot (-25))/f_0 \leq 1/47.134$ The value of $f_0$ which satisfies these two expressions is $f_0 \geq 14.25$.

(Example 2–2) when $P=15\mu$,

◇ when $(\alpha - \beta)\Delta t > 0$, $1/5.790 \leq (785 \times 10^{-6} + 0.3 \times 10^{-6} \cdot (+25))/(20 \cdot 0.015^2) -$ $(3.0 \times 10^{-4} - 2.7 \times 10^{-5}) \cdot (+25)/(1 + 3.0 \times 10^{-4} \cdot$ $(+25))/(1 + 2.7 \times 10^{-5} \cdot (+25))/f_0$ ◇ When $(\alpha - \beta)\Delta t < 0$, $(785 \times 10^{-6} + 0.3 \times 10^{-6} \cdot (-25))/(20 \cdot 0.015^2) -$ $(3.0 \times 10^{-4} - 2.7 \times 10^{-5}) \cdot (-25)/(1 + 3.0 \times 10^{-4} \cdot$ $(-25))/(1 + 2.7 \times 10^{-5} \cdot (-25))/f_0 \leq 1/5.675$ The value of $f_0$ which satisfies these two expressions is $f_0 \geq 2.20$.

In the present embodiment, the relation of expression (28) is used in the manner described above to derive proper relations of the elements $f_0$, $\lambda_0$, P and N.

Figure 17:
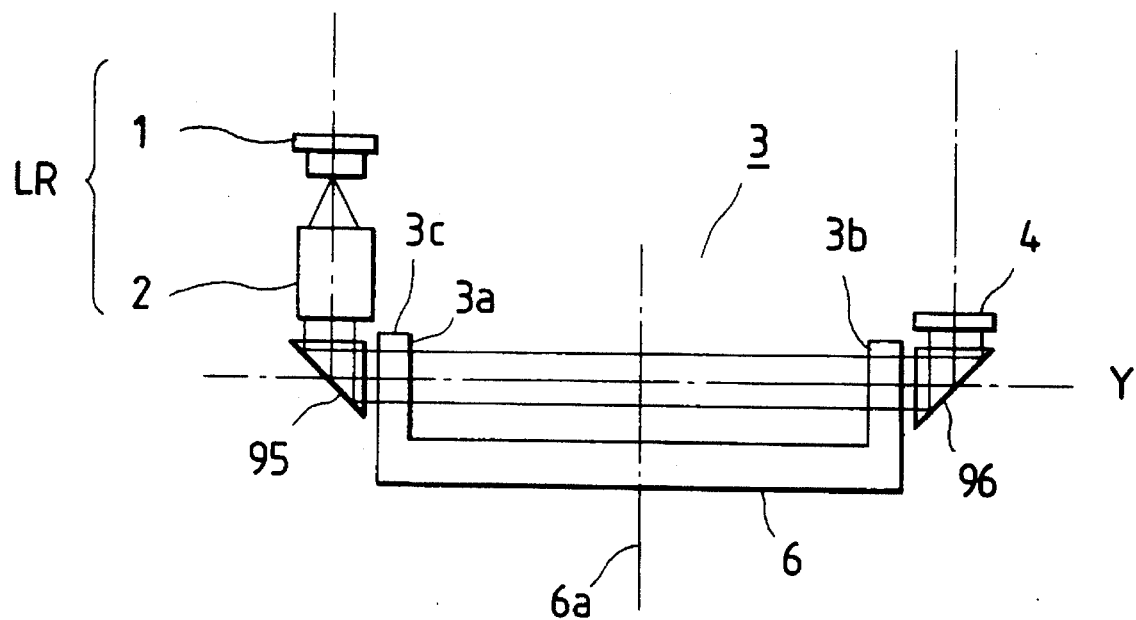
FIG. 17 is a cross-sectional view of the essential portions of Embodiment 5 of the present invention.

FIG. 17 is a cross-sectional view of the essential portions of Embodiment 5 of the present invention. This embodiment differs from Embodiment 3 of FIG. 13 in that the optical axes of the light applying means LR and light receiving means 4 are disposed substantially parallel to the rotational axis 6a of the rotary member 6, and in the other points, the construction of this embodiment is the same as that of Embodiment 3.

That is, in the present embodiment, the light beam from the light applying means LR is caused by light directing means 95 comprising a reflecting prism to enter the first scale 3a of the optical scale 3c. Also, the light beam light-modulated by the second scale 3b of the optical scale 3c is caused by light directing means 96 comprising a reflecting prism to enter the light receiving means 4.

In the present embodiment, the reduction in the diametrical direction is achieved, whereby the downsizing of the entire apparatus is achieved.

According to the above-described embodiments, in a rotary encoder and an encoder utilizing Talbot interference, the diameter (D) of the optical scale, the grating pitch P, the wavelength $\lambda$ of the light beam from the light applying means, the focal length $f_0$ of the lens system, the material of the support member for the light applying means and the arrangement of the light applying means, light receiving means and optical scale are set appropriately, whereby there can be achieved a rotary encoder and an encoder which can obtain highly accurate rotation information or movement information.

What is claimed is:

1. An apparatus for detecting information regarding displacement between a first grating of a grating pitch P and a second grating, comprising:

an illuminating system for applying a light beam to said first grating, said illuminating system including a light source and a lens system for directing the light beam from said light source, said illuminating system being supported by a support member, light emerging from said first grating to which the light beam is applied by said illuminating system being applied to said second grating; and a light receiving element for receiving a light beam emerging from said second grating to which the light is applied, information regarding the displacement between said first grating and said second grating being detected by the light reception of said light receiving element;

wherein when a reference wavelength of the light beam from said light source is $\lambda_0$ and a focal length temperature coefficient of said lens system is $\alpha$ and wavelength temperature coefficient of said light source is $\gamma$ and a coefficient of linear expansion of said support member is $\beta$ and a natural number is N and an amount of environmental temperature variation is $\Delta t$, the following condition is satisfied:

$$\lambda_0/\{(N + 1/5)P^2\} \leq (\lambda_0 + \gamma \cdot \Delta t)/(N \cdot P^2) -$$

$$(\alpha - \beta)\Delta t/\{(1 + \alpha \cdot \Delta t)(1 + \beta \cdot \Delta t)f_0\} \leq \lambda_0/\{(N - 1/5)P^2\}.$$

2. The apparatus of claim 1, wherein the condition that $N \leq 22$ is further satisfied.

* * * * *

UNITED STATES PATENT AND TRADEMARK OFFICE
CERTIFICATE OF CORRECTION

PATENT NO. : 5,559,602
DATED : September 24, 1996
INVENTOR(S) : Nyui

Page 1 of 2

It is certified that error appears in the above-indentified patent and that said Letters Patent is hereby corrected as shown below:

COLUMN 1:

Line 22, "capsten" should read --capstan--.

COLUMN 2:

Line 25, A new paragraph should begin with "FIGS. 5A"; and
Line 26, "FIG. 3" should read --FIG. 3.--.

COLUMN 7:

Line 52, "At" should read --$\Delta t$--; and
Line 67, "$\theta L/\theta t - D\theta t =$" should read --$\theta L/\theta t - \theta D/\theta t$--.

COLUMN 8:

Line 9, "$\theta P/\theta t = \pi/n \cdot \theta/\theta D = 4.4E\text{-}5 \sim 4.4E\text{-}4 nm/°C.$" should read --$\theta P/\theta t = \pi/n \cdot \theta D/\theta t = 4.4E\text{-}5 \sim 4.4E\text{-}4 nm/°C.$--;
Line 13, "in," should read --in--; and
Line 59, "$f_o$ The" should read --$f_o$. The--.

UNITED STATES PATENT AND TRADEMARK OFFICE
CERTIFICATE OF CORRECTION

PATENT NO. : 5,559,602
DATED : September 24, 1996
INVENTOR(S) : Nyui

It is certified that error appears in the above-indentified patent and that said Letters Patent is hereby corrected as shown below:

<u>COLUMN 13</u>:

Line 13, "wave-" should read --a wave---.

Signed and Sealed this

First Day of April, 1997

Attest:

BRUCE LEHMAN

Attesting Officer

Commissioner of Patents and Trademarks